UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS FOR MAKING ACETYL-CELLULOSE PLASTIC COMPOUNDS.

1,041,117. Specification of Letters Patent. Patented Oct. 15, 1912.

No Drawing. Application filed November 27, 1911. Serial No. 662,745.

*To all whom it may concern:*

Be it known that I, WILLIAM G. LINDSAY, a citizen of the United States, residing in Caldwell, county of Essex, State of New Jersey, have invented certain new and useful Improvements in Processes for Making Acetyl-Cellulose Plastic Compounds, of which the following is a specification.

The various compositions to which the present invention relates are employed in the arts, generally as imitations of natural substances, sometimes in their original finished form with or without incorporated colors and other inert substances, and sometimes as films which are used for photographic and other purposes.

Although the final or useful form of the different compounds of acetyl cellulose is that of a solid material, the different processes of conversion into this final solid form involve, as is well understood, the employment of solutions or mixtures of varying consistency as to plasticity, stiffness, or fluidity, depending generally upon the proportion and kind of solvent used to the amount of the original base—acetyl cellulose.

It has been known for many years that camphor and ethyl alcohol in admixture form a solvent for nitrocellulose in the cold or at room temperature, and also that the camphor can be mixed with the nitrocellulose and that the subsequent addition of ethyl alcohol causes solution or conversion of the nitrocellulose. I have found, however, that when that process is applied to acetyl cellulose no solvent action takes place and the object of my invention was to find substances which, when added to acetyl cellulose would exert a solvent action upon the cellulose and produce a plastic mass, and also to find substances that can be added to the mixture so as to render the final product substantially non-inflammable.

In the course of my experiments I have discovered that a mixture of either tetrachlorethyl acetanilid or trichlormethyl acetanilid, or a mixture of the two, in conjunction with methyl alcohol in substantially equal proportions of the solids and the alcohol, will convert that variety of acetyl cellulose which is soluble in acetone into a plastic mass or compound capable of being worked, as in the case of the nitrocellulose—camphor plastic art. I have further found that triphenylphosphate or tricresylphosphate, or a substance similar to these two, in proper admixture, will not prevent the solvent action of the other ingredients named upon the acetyl cellulose, and that their addition serves to render the resulting product substantially non-inflammable.

As one example of practising my invention, I take 100 parts of acetyl cellulose of the acetone soluble variety and mix it with from 15 to 25 parts of either tetrachlorethyl acetanilid or trichlormethyl acetanilid and 15 to 25 parts of either triphenylphosphate or tricresylphosphate, and stir until the mixture is approximately homogeneous. I then add, by sprinkling or otherwise, from 40 to 50 parts of methyl alcohol and allow the mass to soak or macerate at room temperature in a closed vessel until gelatinization of the mass has taken place. The compound can then be worked upon the rolls or in a heated press or mold, as is usual in the nitrocellulose—camphor art. The block or cake thus produced can be cut into sheets and dried in the usual way; or, if desired, the composition may be molded in a suitable heated mold into the final shape desired. If it should be desired to use smaller proportions of the solids, as may be necessary in order to produce a material having a high degree of hardness or solidity, and if this decrease in the amount of solids used results in a mixture having apparently little or no solvent action in the cold, gelatinization may be brought about by heating a mixture containing as low as 10 parts of the solid ingredients of the solvent to 100 parts of the acetyl cellulose (acetone soluble variety) and 50 or more parts of methyl alcohol. As to temperature, the most suitable one is easily ascertained by a few tests and depends upon the consistency desired. Placing the mixture in a suitable closed vessel and subjecting it to the temperature of a boiling water bath or a steam bath of 100° C., gives satisfactory results.

It must be noted that as the proportion of methyl alcohol to the solid ingredient or ingredients of the solvent increases beyond that of 1 to 1, the solvent action in the cold decreases rapidly, but it may be restored by the application of heat and still further promoted by the joint application of heat and pressure. A proportion of 10 parts of the solid ingredient or ingredients of the solvent to 80 parts of methyl alcohol will produce a comparatively thin solution with the aid of heat and pressure. This may be useful in cases where a filtration can be done under the influence of heat and pressure. A solution thus produced will solidify when cold, but it is best to remove the excess of methyl alcohol by evaporation down to, say, equal parts of solids and methyl alcohol before cooling.

It will be understood that slight variations in the proportions of the ingredients of my new solvents and their proportion to the acetyl cellulose would not be a departure from the spirit of my invention, and it will likewise be understood by those skilled in the art that it is permissible to mix the acetyl cellulose and the ingredients of my new solvents in any order desired so long as solvent action is not permitted to take place so soon as to prevent incorporation of the cellulose with the ingredients of the solvent. It will also be understood that coloring matters and other inert substances can also be incorporated if desired.

Having thus described my invention, what I claim is:—

1. The process of dissolving or converting acetyl cellulose which consists in dissolving or converting an acetyl cellulose that is soluble in acetone, by the use of one or more members of the hereinbefore-specified group of acetanilids (tetrachlorethyl acetanilid, trichlormethyl acetanilid) and one or more of the hereinbefore specified group of phosphates (triphenylphosphate, tricresylphosphate) together with methyl alcohol, substantially as described.

2. The process of dissolving or converting acetyl cellulose which consists in dissolving or converting an acetyl cellulose that is soluble in acetone, by (1) mixing said acetyl cellulose with one or more of the hereinbefore-specified group of acetanilids (tetrachlorethyl acetanilid, trichlormethyl acetanilid) and one or more of the hereinbefore-specified group of phosphates (triphenylphosphate, tricresylphosphate); and (2) adding methyl alcohol to the mixture, substantially as described.

3. The process of dissolving or converting acetyl cellulose which consists in dissolving or converting an acetyl cellulose that is soluble in acetone, by (1) mixing said acetyl cellulose with one or more of the hereinbefore-specified group of acetanilids (tetrachlorethyl acetanilid, trichlormethyl acetanilid) and one or more of the hereinbefore-specified group of phosphates (triphenylphosphate, tricresylphosphate) and coloring matters or other inert substances; and (2) adding methyl alcohol to the mixture, substantially as described.

WILLIAM G. LINDSAY.

Witnesses:
   J. E. HINDON HYDE,
   MABEL DENTON.